(12) United States Patent
Einarsson et al.

(10) Patent No.: US 10,933,830 B2
(45) Date of Patent: Mar. 2, 2021

(54) RESTRAINING DEVICE AND VEHICLE SEAT

(71) Applicant: AUTOLIV DEVELOPMENT AB, Vargarda (SE)

(72) Inventors: Anders Einarsson, Vargarda (SE); Jack Johansson, Landvetter (SE)

(73) Assignee: AUTOLIV DEVELOPMENT AB, Vargarda (SE)

(*) Notice: Subject to any disclaimer, the term of this patent is extended or adjusted under 35 U.S.C. 154(b) by 77 days.

(21) Appl. No.: 16/355,158

(22) Filed: Mar. 15, 2019

(65) Prior Publication Data

US 2019/0299899 A1    Oct. 3, 2019

(30) Foreign Application Priority Data

Mar. 29, 2018 (EP) .................................. 18164870

(51) Int. Cl.
| | | |
|---|---|---|
| *B60R 21/18* | (2006.01) | |
| *B60R 21/207* | (2006.01) | |
| *B60R 21/233* | (2006.01) | |
| *B60R 21/261* | (2011.01) | |
| *B60R 21/00* | (2006.01) | |

(52) U.S. Cl.
CPC ............ *B60R 21/18* (2013.01); *B60R 21/207* (2013.01); *B60R 21/233* (2013.01); *B60R 21/261* (2013.01); *B60R 2021/0004* (2013.01); *B60R 2021/0048* (2013.01); *B60R 2021/23324* (2013.01); *B60R 2021/2612* (2013.01)

(58) Field of Classification Search
CPC ..... B60R 21/231; B60R 21/18; B60R 21/233; B64D 11/06205
See application file for complete search history.

(56) References Cited

U.S. PATENT DOCUMENTS

| | | | |
|---|---|---|---|
| 5,871,230 A | * | 2/1999 | Lewis .................... B60R 21/18 280/733 |
| 6,286,860 B1 | | 9/2001 | Adomeit et al. |
| 9,517,744 B2 | | 12/2016 | Shimazu |

(Continued)

FOREIGN PATENT DOCUMENTS

| | | | |
|---|---|---|---|
| DE | 2304019 A1 * | 8/1973 | ....... B60R 21/23138 |
| DE | 197 25 558 A1 | 12/1998 | |

(Continued)

OTHER PUBLICATIONS

European Search Report of EP 18 16 4870, dated Jul. 13, 2018.

*Primary Examiner* — Karen Beck
(74) *Attorney, Agent, or Firm* — Dickinson Wright PLLC

(57) ABSTRACT

A restraining device for an occupant (0) seated in a vehicle seat including a carrier (20) extending over the lap of the seated occupant (0) when the restraining device is in use, an airbag (32) having an airbag main body (40) enclosing a main gas space and extending from a lower end (40*a*) to an upper end (40*b*) being located above the lower end (40*a*) when the airbag main body (40) is in its deployed state, and an inflating device for filling the main gas space. The airbag main body (40) is connected to the carrier (20) via a connection section at the lower end (40*a*) of the airbag main body (40) and has an impact wall (42). In order to be independent of a support from another part of the vehicle the airbag main body (40) tapers from its lower end (40*a*) to its upper end (40*b*).

14 Claims, 11 Drawing Sheets

(56) References Cited

U.S. PATENT DOCUMENTS

| | | | |
|---|---|---|---|
| 9,623,831 B1* | 4/2017 | Deng | B60R 21/01 |
| 2010/0025972 A1* | 2/2010 | Nezaki | B60R 22/26 |
| | | | 280/730.1 |
| 2013/0106079 A1* | 5/2013 | Jarboe | B64D 11/06 |
| | | | 280/730.1 |
| 2015/0069741 A1* | 3/2015 | Shimazu | B60R 21/18 |
| | | | 280/728.3 |
| 2017/0120855 A1 | 5/2017 | Deng et al. | |
| 2017/0225788 A1* | 8/2017 | Humbert | B64D 11/06205 |
| 2017/0282834 A1* | 10/2017 | Sugie | B60R 21/233 |
| 2017/0355344 A1* | 12/2017 | Choi | B60R 21/235 |
| 2018/0236962 A1* | 8/2018 | Ohno | B60R 21/23138 |
| 2020/0017059 A1* | 1/2020 | Choi | B60R 21/23138 |

FOREIGN PATENT DOCUMENTS

| | | |
|---|---|---|
| DE | 299 21 162 U1 | 5/2000 |
| DE | 100 18 019 A1 | 10/2001 |

\* cited by examiner

RESTRAINING DEVICE AND VEHICLE SEAT

CROSS-REFERENCE TO RELATED APPLICATION

This application claims the benefit of priority to European Patent Application No. 18164870.0, filed Mar. 29, 2018, the contents of which are incorporated herein by reference in their entirety.

FIELD OF THE INVENTION

The invention relates to a motor vehicle restraining device and to a vehicle seat with such a restraining device.

BACKGROUND

Frontal airbag modules are widely used in the automotive technology and almost every modern passenger car is equipped with a driver frontal airbag module being mounted into a steering wheel body and with a passenger frontal airbag module being located inside the instrument panel.

SUMMARY AND INTRODUCTORY DESCRIPTION OF EMBODIMENTS OF THE INVENTION

"Traditional" frontal airbag modules are based on the traditional passenger car concept. In this traditional concept, all vehicle seats are oriented such that the person sitting on the seats look face in the driving direction of the car. Further, the distance between the airbag module and the person to be protected is at least approximately known.

For example from EP 1 326 767 B1 a restraining device is known which is basically composed of a lap belt, an airbag attached to the lap belt and an inflating device for inflating the airbag. The airbag includes an airbag main body which has basically the structure of a side airbag, meaning that it is composed of two walls, one pointing towards the person to be protected and one pointing towards a vehicle part in front of the person to be protected, such that the wall pointing towards the person to be protected forms the impact wall and the other wall forms the support wall. This restraining device is especially designed for a person seated in the rear of the vehicle such that the support wall can be supported by the backrest of a front seat.

A similar concept is shown in DE 10 2012 221 533 A1, but here the airbag and the inflator are not attached to a lap belt, but to another kind of carrier element, namely a rigid element being movable relative to the vehicle seat.

U.S. Pat. No. 8,585,084 B1 also shows a similar concept, but with a relatively small airbag being exclusively located in front of the thorax of the occupant.

For example from U.S. Pat. No. 7,513,524 B2 a restraining device is known which also uses at least one belt-mounted airbag. Here this at least one airbag is held by a lap belt and a shoulder belt.

Many modern vehicle concepts seek for turning the passenger compartment of the vehicle (which could be a passenger car, but also a bus, a boat or a plane) into a "living room" especially for autonomous driving passenger cars. In such concepts it should be possible to turn the seats into different orientations (especially it should be possible to turn at least some of the seats facing an orientation against the travelling direction of the vehicle). Additionally it is desired to have a restraining concept which does not necessarily need a shoulder belt, because the wearing of a shoulder belt is in some contrast to a "living room feeling".

In view of the foregoing, embodiments of this invention have the task to provide a restraining device that satisfies the above defined requirements.

This task is solved by a restraining device with the features described herein. A vehicle seat with such a restraining device is also described.

As known from generic EP 1 326 767 B1 a restraining device includes a carrier element extending over the lap of the seated occupant when the restraining device is in use, an airbag and an inflating device. This airbag has a main body enclosing a main gas space and extending from a lower end to an upper end being located above the lower end when the airbag main body is in its deployed state. The airbag main body is connected to the carrier via a connection section at the lower end of the airbag main body, and presents an impact wall with an impact surface facing the seated person when the airbag is in its deployed state. Preferably this is the only connection the airbag has to another element so that the airbag main body is exclusively connected to the carrier extending over the lap of the occupant.

According to embodiments of the present invention the airbag main body tapers from its lower end to its upper end.

From this tapered shape it follows that the airbag main body has a bottom whose extension in the direction away from the connection section is relatively large, for example between 20 and 40 cm. From this large extension of the bottom wall it follows that the system "person to be protected—airbag main body" is self-supporting because the bottom wall is sufficiently supported by the thighs of the person. One could also say that the person to be protected and the inventive restraining device form an autonomous system not needing another part of the vehicle as support. Because the support by another part of the vehicle is not only not necessary, it should be avoided because it is of course desired that the restraining function of the airbag main body is independent of the position and orientation of the vehicle seat. The tapered shape of the airbag main body makes sure that under normal conditions, it does not come into contact with another part of the vehicle or with another person in the vehicle. Another advantage of this tapered shape is that the upper part of the airbag main body can to some extent tilt relative to a lower part such that too high forces in the neck of the person can be avoided.

In preferred embodiments of the present invention, the fully deployed airbag main body has a basically triangle shape when viewed horizontally from the side, such that the fully deployed airbag main body is basically wedge-shaped and has the impact wall, a bottom wall, a connecting wall connecting the bottom wall and the impact wall and two side walls. The impact wall, the bottom wall and the connecting wall can be made from a single cutting. The sidewalls extend basically perpendicularly tor the impact wall, the bottom wall and the connecting wall.

In order to restrain the person at an early point in time, it is preferred that the impact surface of the deployed airbag main body is located close to the occupant. In order to achieve this, it is often to be preferred that the connection section is adjacent the edge between the impact wall and the bottom wall and that the impact wall extends basically perpendicularly from the bottom wall.

Because of the above design constraints the problem could arise that too high forces are applied to the abdomen of the person, especially (but not exclusively) if the person is a pregnant women. In order to prevent this, an indention in the lower area of the impact wall can be provided.

In order to provide the possibility to react on different accident scenarios (for example a frontal crash or a laterally offset frontal crash) it is possible to design the main gas space enclosed by the airbag body with at least two chambers that can be filled with inflation gas at least partly independently. So, the deployment of the airbag main body can be adapted to the trajectory of the person relative to the vehicle.

In order to even better protect the head of the person, at least one additional airbag body can extend from the airbag main body at an upper end region of the airbag main body. This additional airbag body encloses an additional gas space being in fluid communication with the main gas space, and having an additional impact surface. Especially if two such additional airbag bodies are provided, the occupant's head can be protected very well from being hit by an object.

The inflating device can be placed inside the airbag main body, but often it will be preferred to locate it outside the airbag main body and to connect it to the main gas space by use of at least one gas guide, for example in form of a hose.

BRIEF DESCRIPTION OF THE DRAWINGS

The invention will now be described in detail in view of preferred embodiments in view of the figures. The figures show.

DETAILED DESCRIPTION

Figure 1:
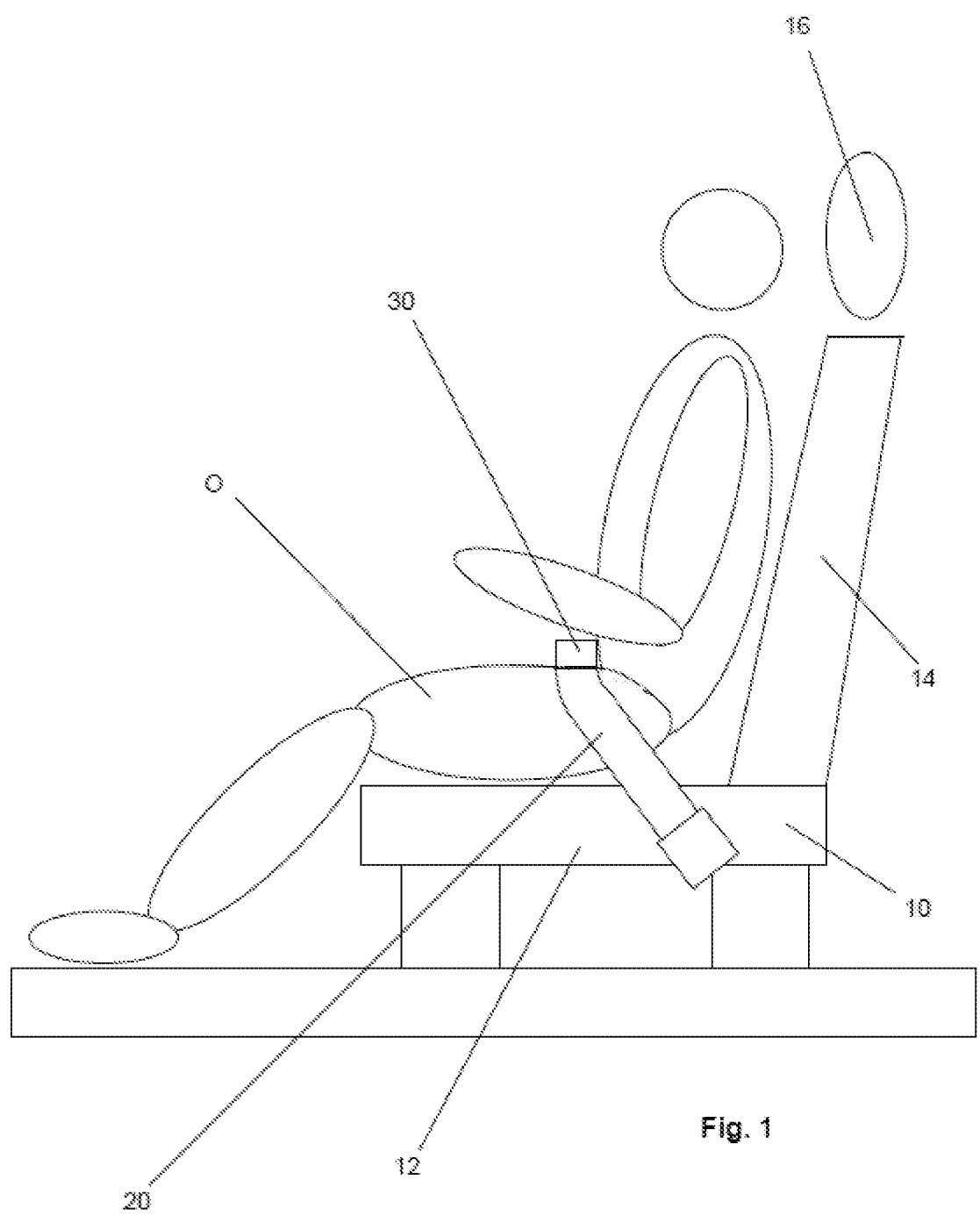
FIG. 1 is a schematic side elevation of an occupant being seated on a vehicle seat and a restraining device in its not actuated state.

FIG. 1 shows a side view to a vehicle seat 10 with an occupant O being seated on it. The occupant O is secured by a restraining device; the restraining device is in its resting state (before activation). The restraining device is composed of carrier element 20, here in form of a lap belt, extending over the lap of the seated occupant O when the restraining device is in use (as shown). This carrier element 20 carries an airbag package and an inflator. The inflator is not shown in FIG. 1. In most cases, the inflating device will be located inside the airbag, but in some cases the inflating device might also be outside the airbag. The airbag package 30 is placed on the lap of the occupant. The vehicle seat 10 is (as every vehicle seat) composed of a seating 12, a backrest 14 and a headrest 16.

Figure 2:
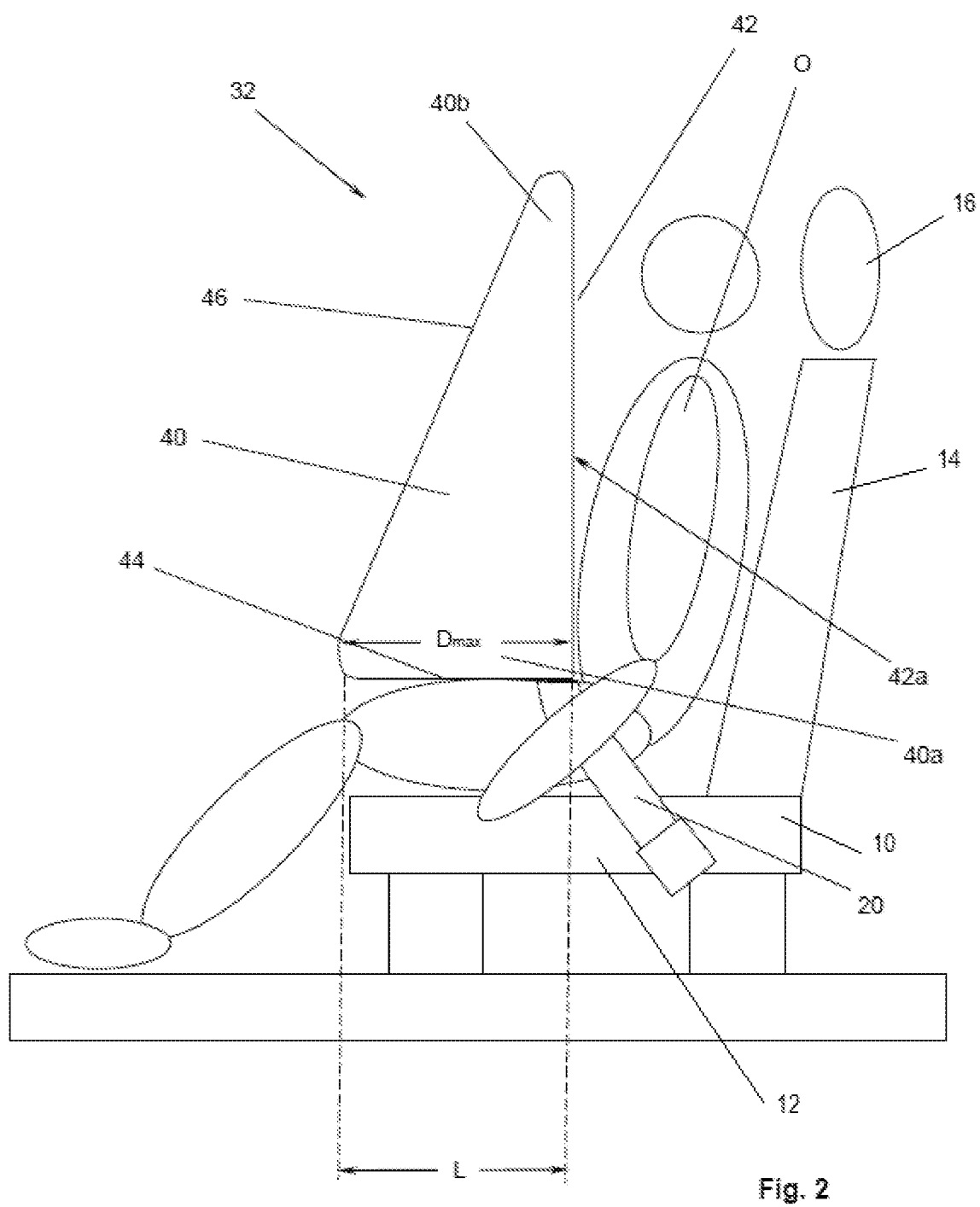
FIG. 2 shows the restraining device after it has been activated with the main body of the airbag in its fully deployed state.

FIG. 2 shows what is shown in FIG. 1 after an accident has been detected and the inflating device has been triggered by the electronic system of the vehicle. FIG. 2 shows the airbag 32 in its fully deployed state. The airbag includes a main body 40. In the first embodiment shown, the airbag is exclusively formed of this airbag main body 40, but inner tethers or the like could also be present. According to embodiments of the invention, this airbag main body 40 is basically wedge shaped, meaning that the lower end 40a of the airbag main body near the bottom wall 44 of the airbag main body 40 has a relatively large maximum depth $D_{max}$, for example, of between 30 cm and 50 cm. This maximum depth $D_{max}$ is basically identical to the length L of the bottom wall 44. From this lower end 40a the airbag main body 40 tapers (narrows) towards the upper end 40b which is located at the height of the headrest 16. So in the side view of FIG. 2 the deployed airbag main body 40 is basically triangle-shaped such that it has a bottom wall 44 extending basically horizontally along the thighs of the occupant, an impact wall 42 extending from this bottom wall 44 in a basically vertical direction and a connecting wall 46. The surface of the impact wall 42 facing the occupant O is referred to as the impact surface 42a. The upper end of the impact wall 42 is connected to the occupant distal end of the bottom wall 44 by the connecting wall 46.

FIG. 2 directly demonstrates one advantage of the wedge shaped design. The airbag main body 40 is supported by its bottom wall 44 lying on the thighs of the occupant O. This means that no additional support surface of the vehicle is necessary.

Figure 3:
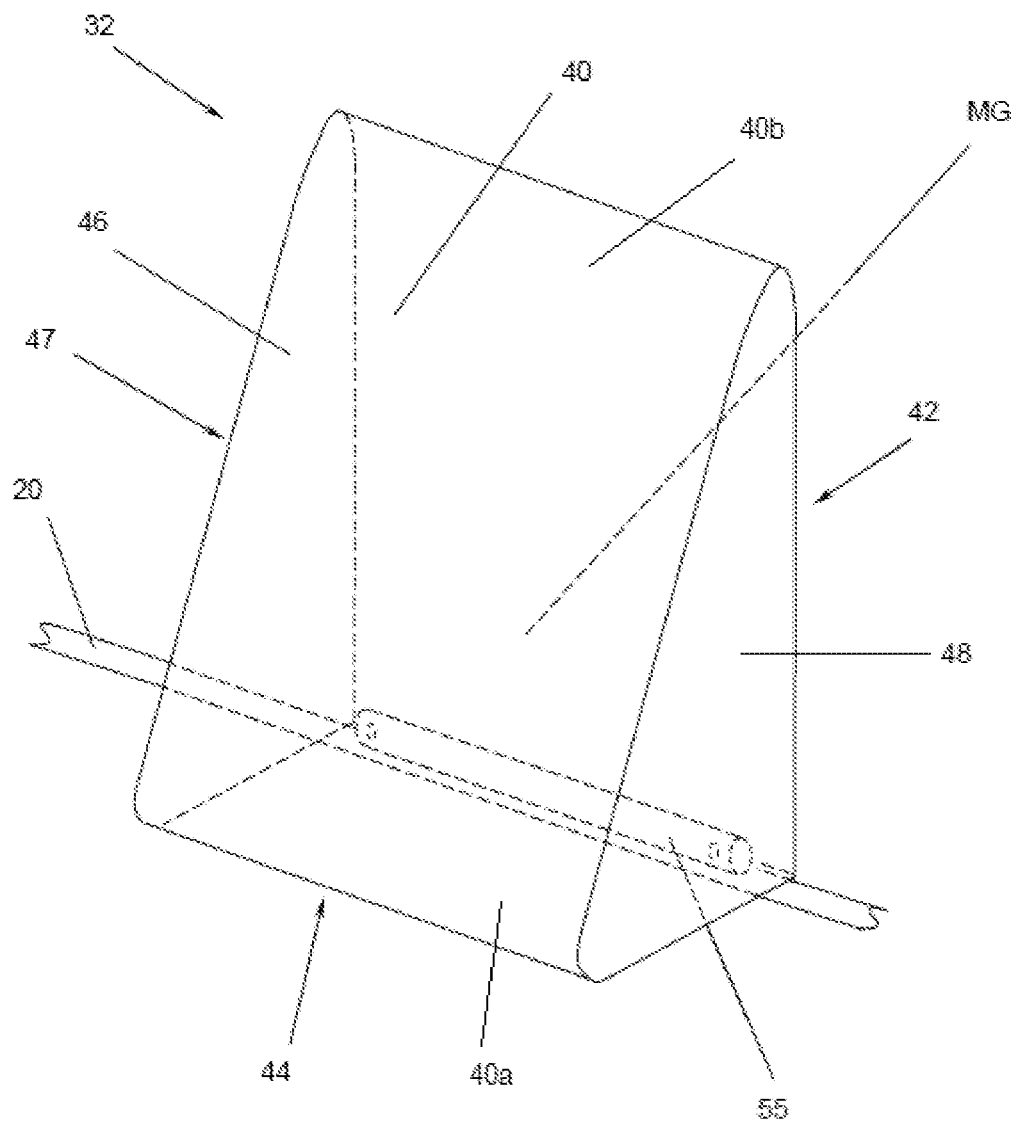
FIG. 3 shows the restraining device of FIG. 2 in a perspective view.

As can best be seen from FIG. 3, the airbag main body is closed on its sides by the two side walls 47 and 48. The airbag main body 40 can be made of three pieces, namely one piece forming the bottom wall 44, the impact wall 42 and the connecting wall 46 and each one piece forming a side wall 47 and 48. The volume of the main gas space MG enclosed by the main airbag body 40 is preferably between 50 litres and 130 litres; with about 115 litres turned out to be a very suitable volume. The inflating device in form of an inflator 55 is located inside the airbag main body 40. In FIG. 3 one can additionally see that the bottom wall 44 is connected to the carrier 20 (in this case the lap belt).

Figure 4:
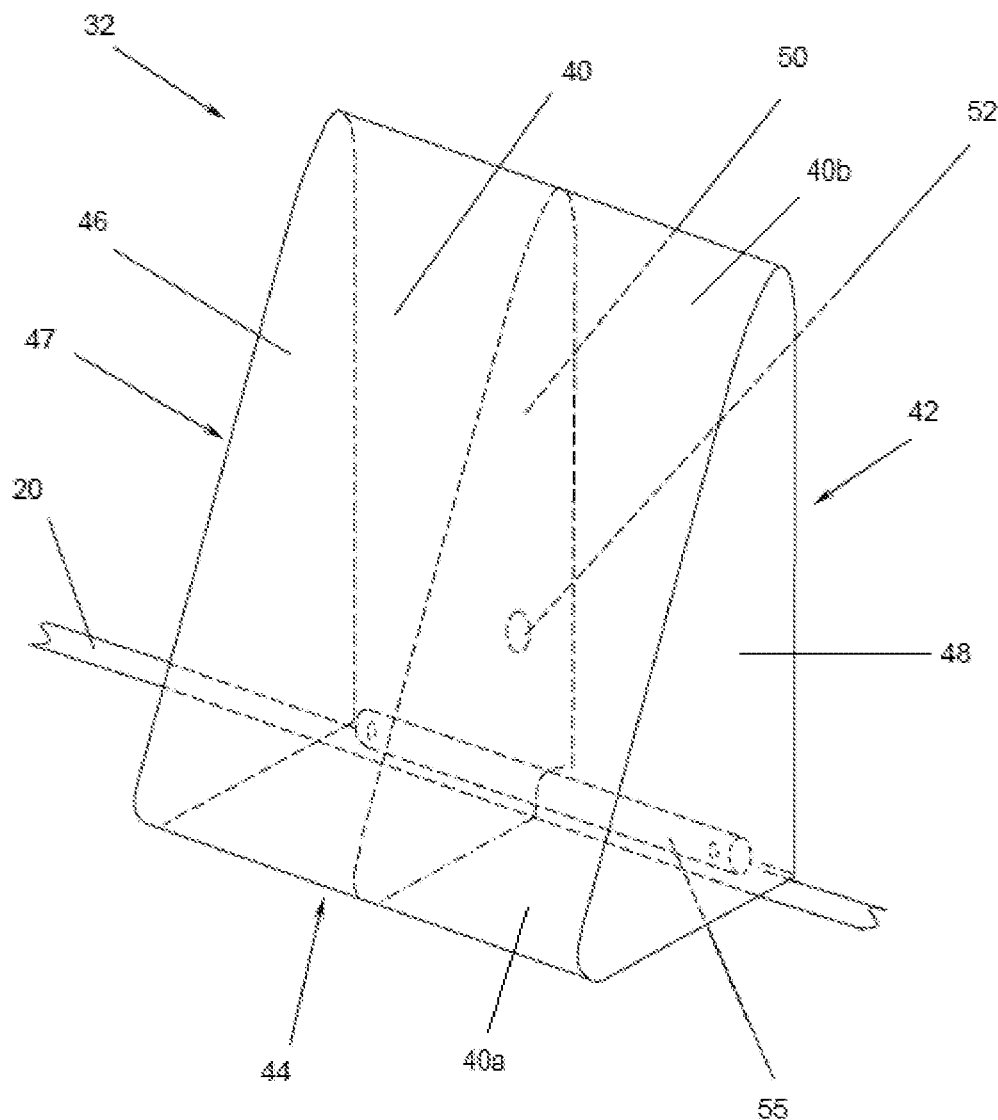
FIG. 4 shows a variation to the restraining device shown in FIG. 3.

FIG. 4 shows a variation of the restraining device just described. In this embodiment, the airbag additionally includes a dividing wall 50 extending basically parallel to the two side walls 47, 48 and dividing the main gas space into two chambers. A vent 52 can be provided in this dividing wall. Depending on the desired behaviour of the airbag, this vent 52 can simply be an overflow opening, a one way valve or a valve that can actively be opened or closed or which open or closes depending on the pressure difference between the two chambers. The inflator 55 has outlet ports in both chambers and preferably this inflator is a dual stage inflator such that the two chambers can be selectively inflated. Such a two (or more) chamber design can especially be advantageous in case of a laterally offset frontal crash leading to a movement of the occupant in an angled direction relative to the vehicle longitudinal axis. In this case, the chamber which is hit first by the occupant can be inflated first. By these features, a slipping of the head/ thorax of the occupant from the impact surface 42a can be prevented and the person can be guided, especially towards the middle of the vehicle.

Figure 5:
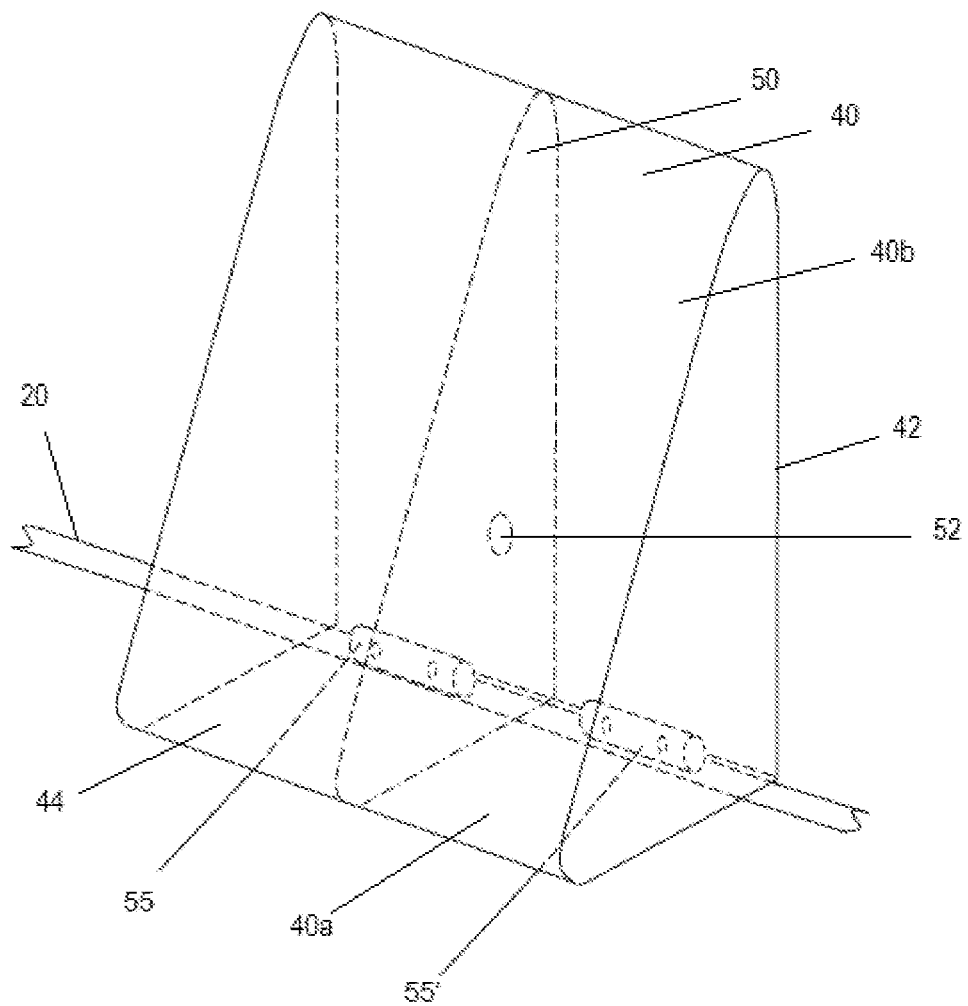
FIG. 5 shows a variation to the restraining device shown in FIG. 4.

As can be seen from FIG. 5 in case of a two chamber design also two separate inflators 55 and 55' can be provided.

Figure 6:
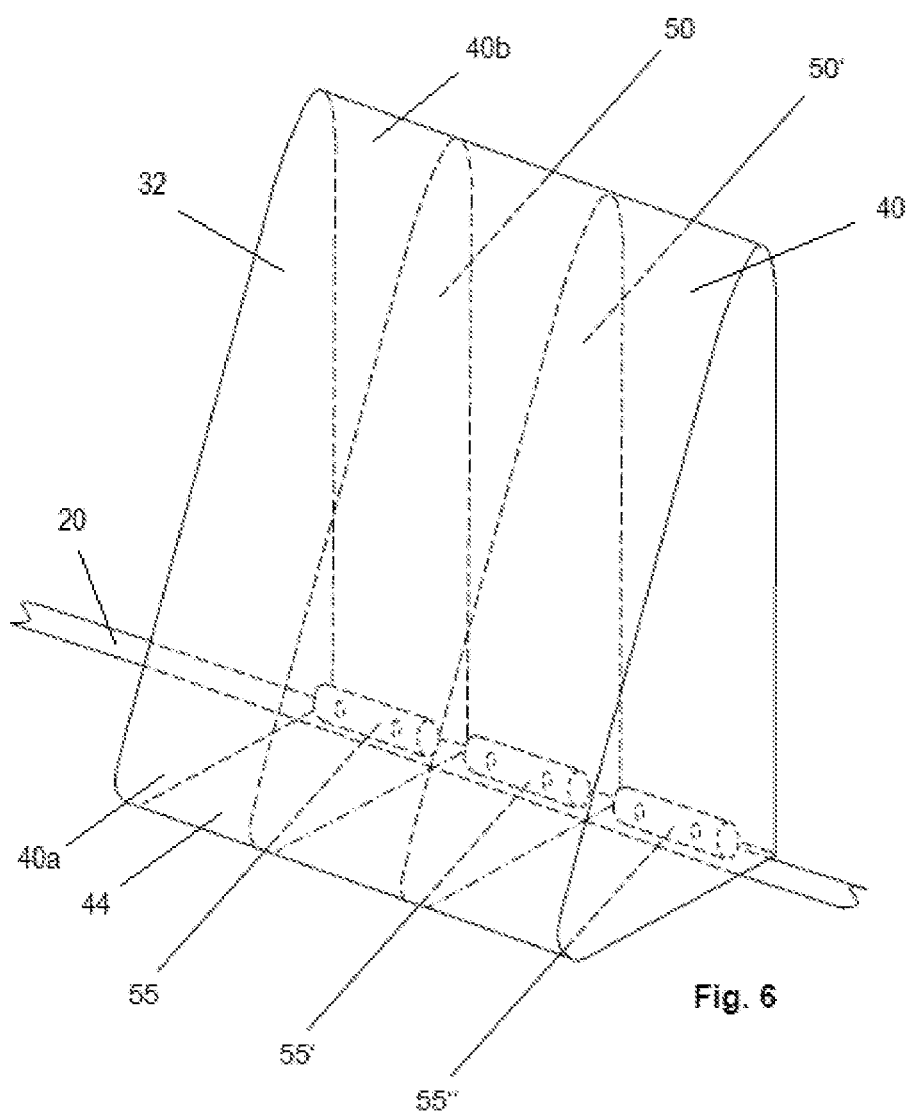
FIG. 6 shows another variation to the restraining device of FIG. 3.

As can be seen from FIG. 6 of course more than one dividing wall, for example two dividing walls 50 and 50' can be provided. In the case of the embodiment of FIG. 6, the main gas space is divided into three chambers. As in the embodiments of FIGS. 4 and 5, vents can be provided in the two dividing walls 50 and 50', but this is not shown here. As in the embodiments of FIGS. 5 and 4 it is preferred that each chamber can be filled separately, in the example embodiment of FIG. 6 by use of separate inflators 55, 55' and 55".

Figure 7:
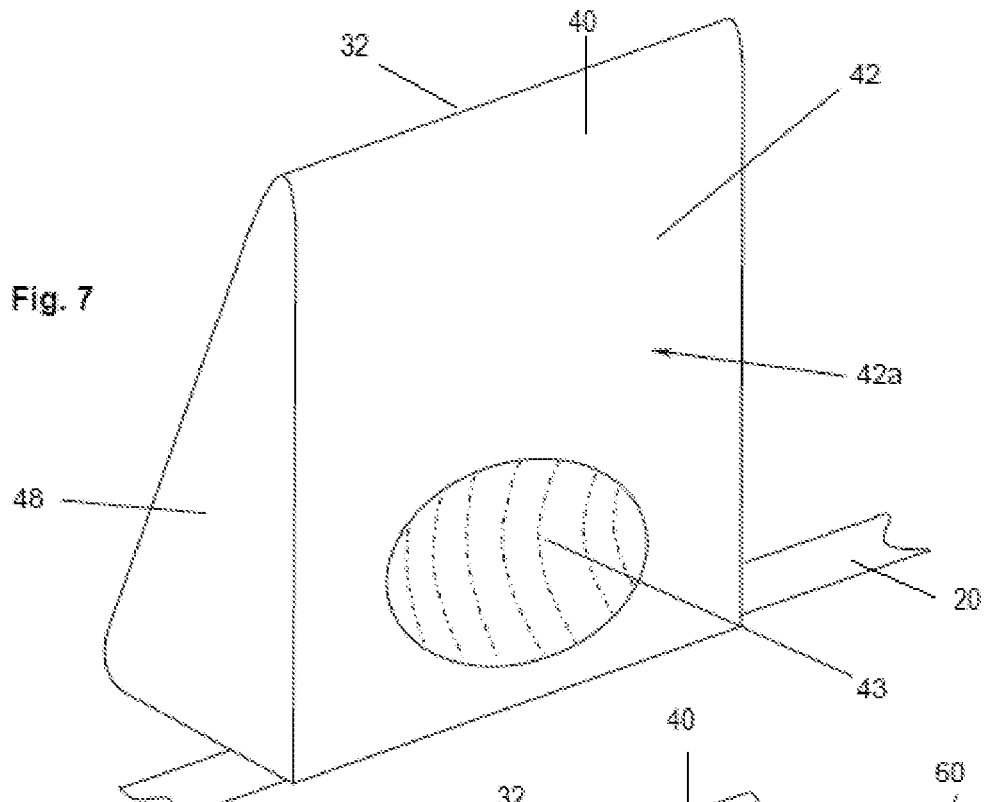
FIG. 7 is a view from another angle to one of the restraining devices of FIGS. 3 to 6.

As shown in FIG. 7 it can be preferred (this refers to all embodiments of this application) that an indention 43 is provided in the impact wall 42 at its lower end. By provision of such an indention 43, the force to the abdomen is reduced which is especially beneficial if the occupant O is a pregnant woman. This indention 43 could also extend to the lower edge of the impact wall 42 (not shown). In order to fully understand the advantages of such an indention 43 one should keep in mind that according to the design of the inventive restraining device the impact surface 42a is very close to the occupant to be supported, especially at the lower end of the impact surface 42a, since the airbag main body extends from a carrier placed over the lap.

Figure 8:
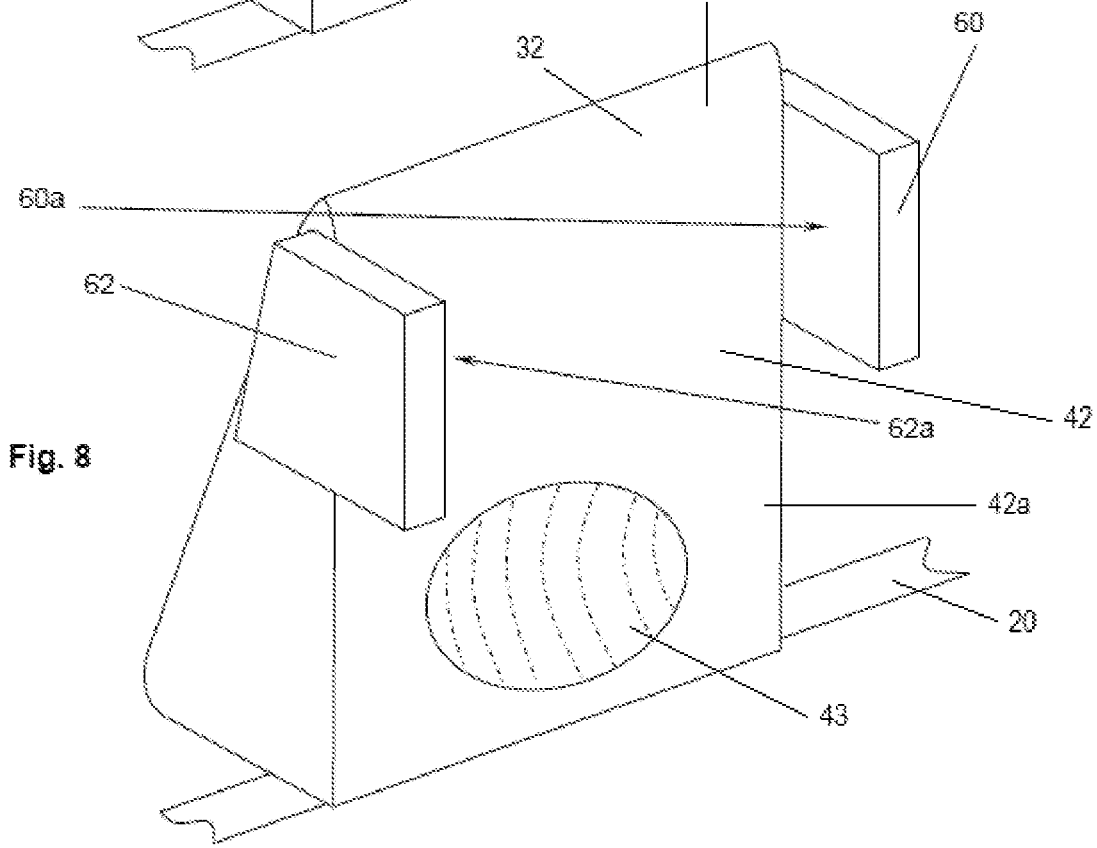
FIG. 8 shows another embodiment in a representation according to FIG. 7.

As can be seen from FIG. 8, with at least one additional airbag body (in the case shown, two additional airbag bodies) can extend from the airbag main body at an upper end region of the airbag main body 40. This at least one additional airbag body 60, 62 extends from a lateral side of the airbag main body 40. In the embodiment shown it is attached to a side wall 47 and 48. Such an additional airbag body helps to protect especially the head of the occupant O in case of a side crash or an offset frontal crash and from being hit by objects flying around in the passenger compartment. Each additional airbag body 60 and 62 encloses an additional gas space being connected to the main gas space by use of at least one overflow opening (not shown in the figures). The surface of the additional airbag body 60 and 62 pointing towards the head of the occupant is referred to as additional impact surface 60a and 62a. In the embodiment shown in FIG. 8, the impact wall 42 shows an indention. This will in many cases be preferred but it needs to be mentioned that the at least one additional airbag body could of course also be provided in a case in which the impact wall does not show an indention.

Figure 9:
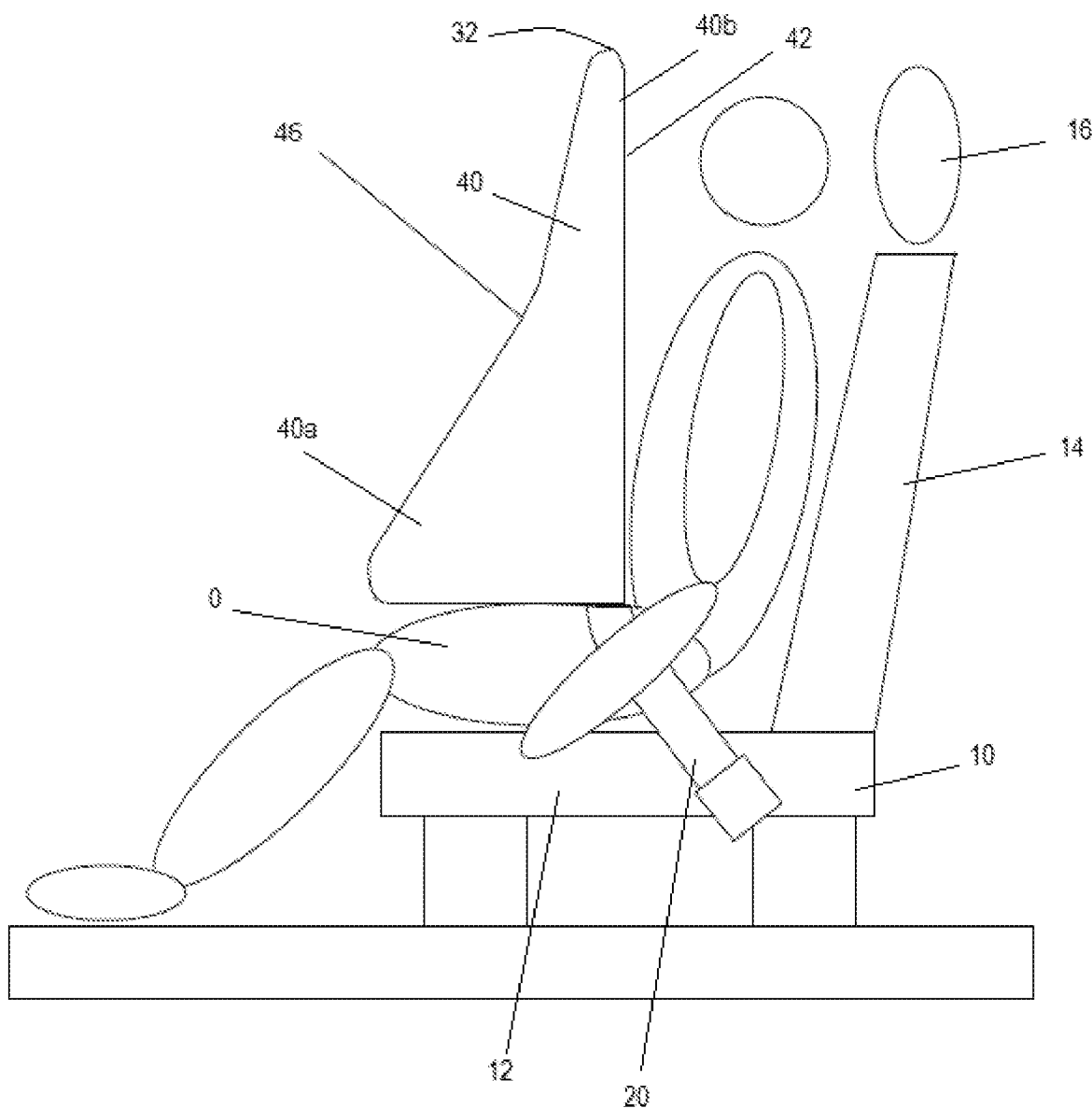
FIG. 9 shows a variation to what is shown in FIG. 2 in a representation according to FIG. 2.

As can be seen from FIG. 9 the side walls 47 and 48 do not need to be perfect triangles but can for example be slightly concave.

Figure 10:
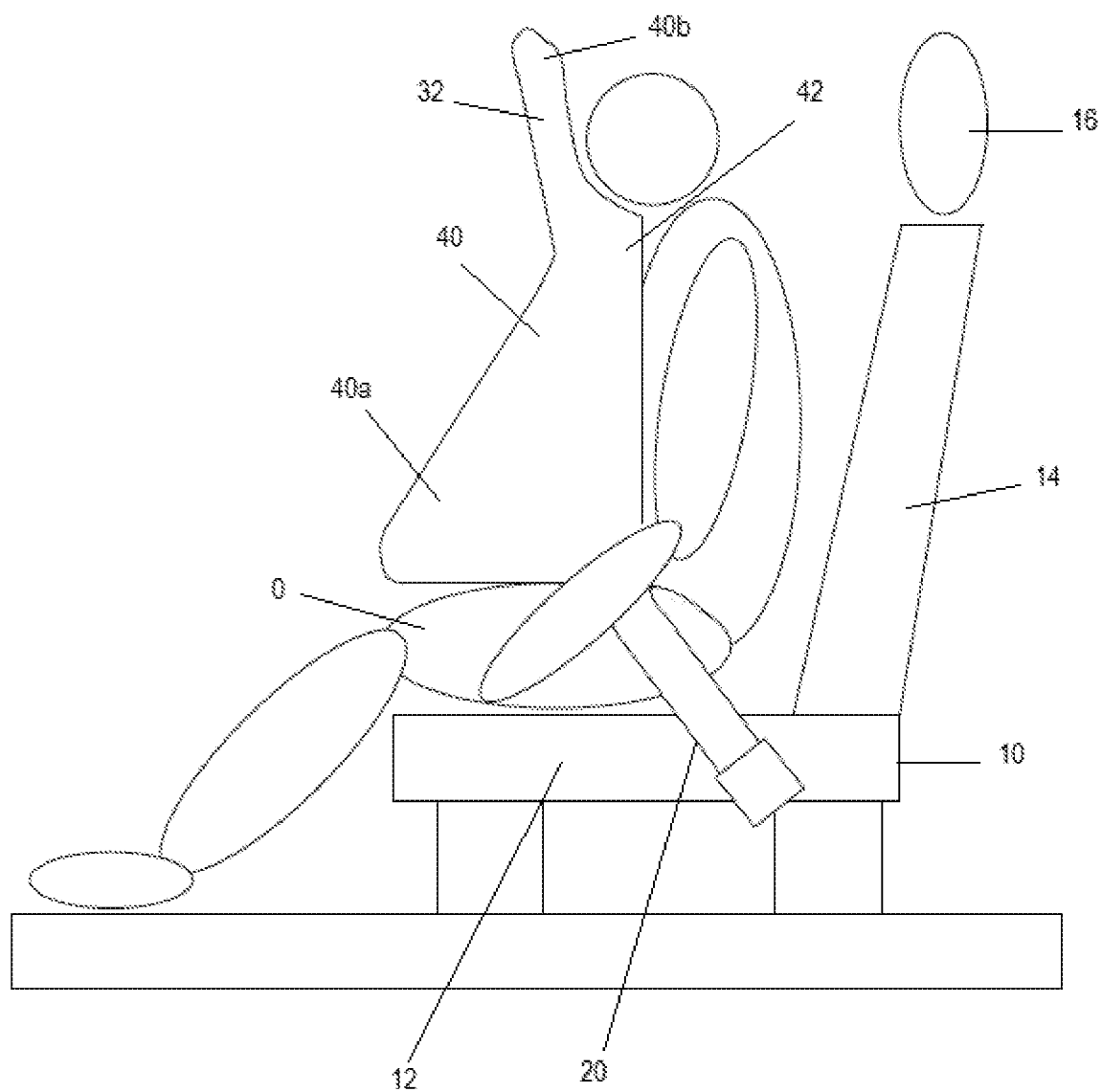
FIG. 10 shows what is shown in FIG. 9 after the occupant has hit the impact surface of the airbag main body.

Because of the tapered top end of the airbag main body 40, the head of the occupant O can move to some extent into the direction of deceleration by deforming the airbag main body 40. Thereby, a bending back of the head is avoided (FIG. 10).

Figure 11:
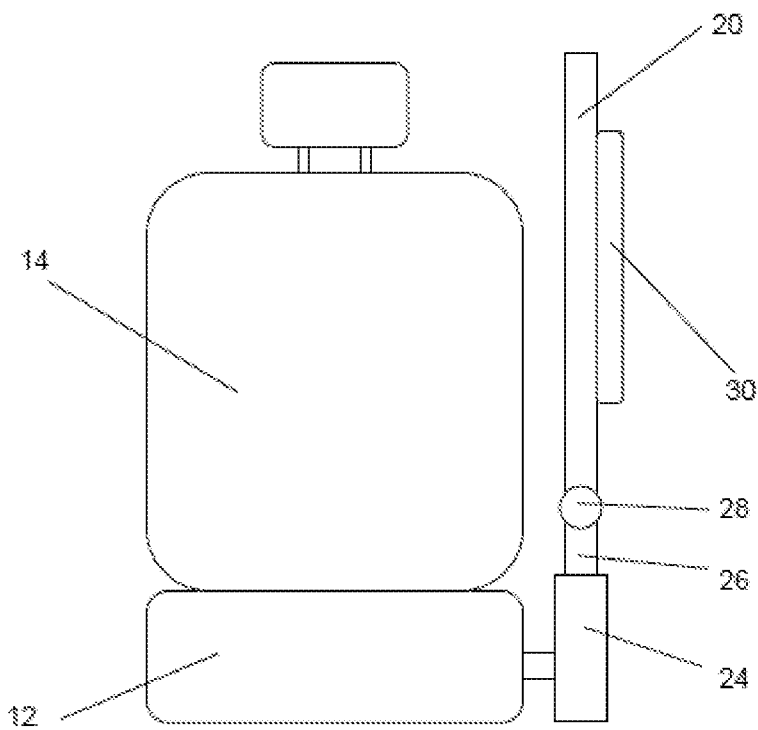
FIG. 11 is a frontal view of a vehicle seat with a restraining device with another kind of a carrier element.
Figure 12:
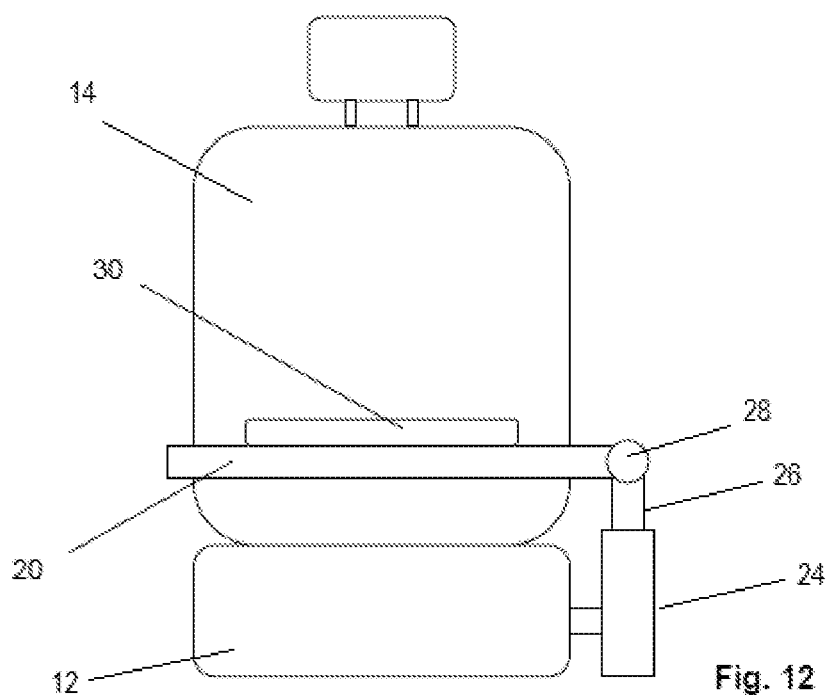
FIG. 12 is a frontal view showing the carrier element of FIG. 11 when the carrier element is in its operating position.

FIGS. 11 and 12 show another embodiment of a carrier 20 which is here in form of a rigid bar carrying the airbag package 30. This rigid bar (carrier 20) is connected to a movable part 26 of a support by a joint 28 such that it can be in a raised position (FIG. 11) in which the occupant can stand up and sit down, and in a lowered operating position in which the carrier 20 is positioned above the lap of the occupant. Usually it will be necessary that the height of the carrier 20 can be adjusted. For this reason, the movable part 26 is vertically movable relative to the stationery part 24. The stationery part 24 can rigidly be connected to the vehicle seat 10.

Figure 13:
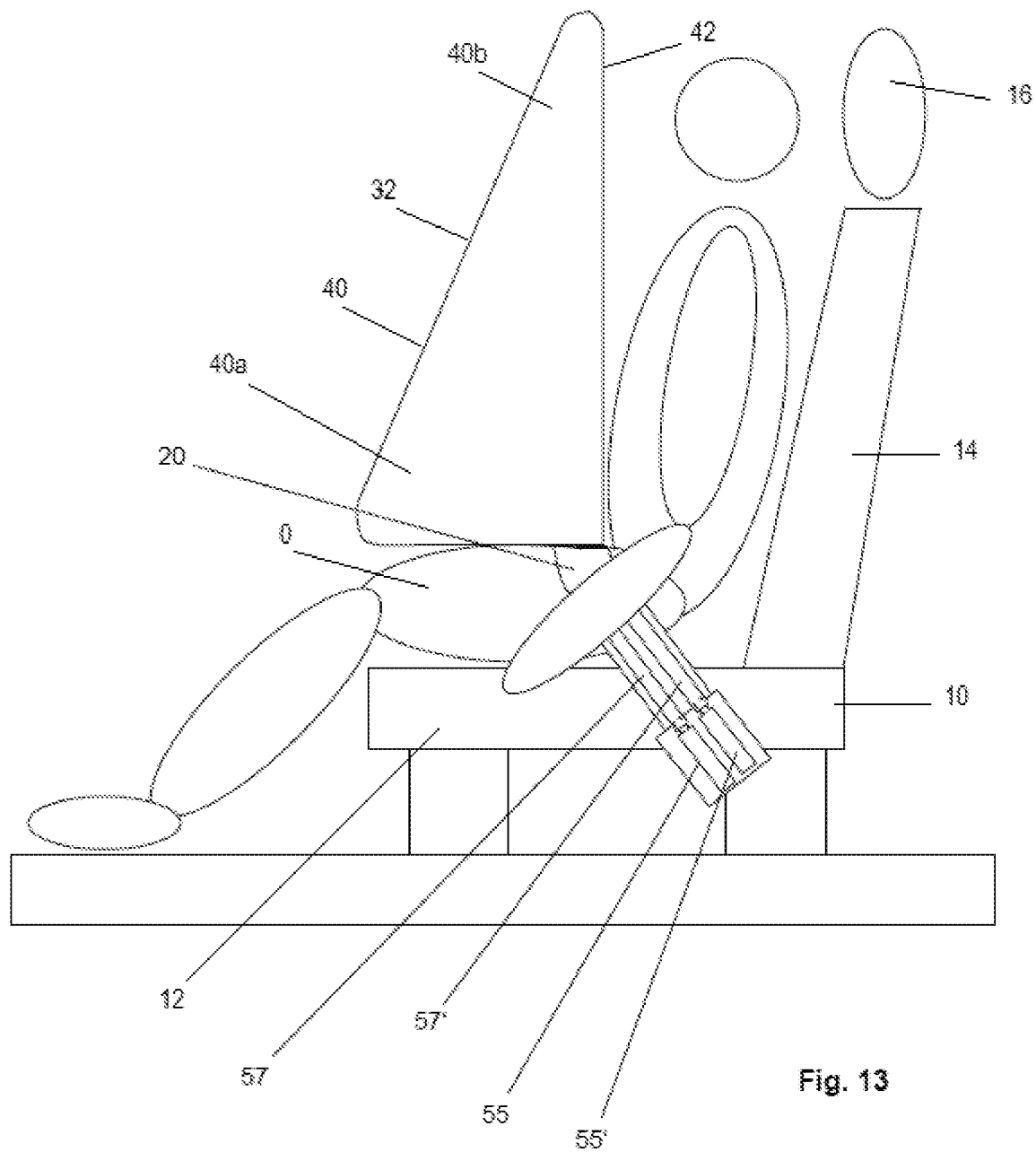
FIG. 13 shows an embodiment in which the inflating device is located outside the airbag.

Instead of locating the inflating device inside the airbag main body as shown up to now, it is also possible (and often preferred) to located the inflating device outside the airbag main body and to connect the inflating device with the airbag main body by use of at least one gas guide. The advantage of this is that weight and volume are saved at the airbag package being placed on the lap of the occupant. An example for this is shown in FIG. 13. Here two inflators 55 and 55' and two gas guides 57 and 57' in the form of flexible hoses are provide. The inflators can be located at the anchor of the lap belt and the flexible hoses can be connected to the lap belt. Depending on the number of chambers, of course only one inflator and only one gas guide or more than two inflators and more than two gas guides could be provided. Placing the inflators outside the airbag is of course also possible in case of a bar-type carrier as shown in FIGS. 11 and 12.

The module placed to the lap of the occupant can additionally include a display with or without a touch pad and/or buttons to control functions of the vehicle, like lamps, speakers, microphones or the like. Such functions will especially improve the acceptance of the restraining device by the person using it.

While the above description constitutes the preferred embodiment of the present invention, it will be appreciated that the invention is susceptible to modification, variation and change without departing from the proper scope and fair meaning of the accompanying claims.

The invention claimed is:

1. A restraining device for an occupant seated in a vehicle seat comprising;
   a carrier adapted to extend over the lap of the occupant when the restraining device is in a use condition,
   an airbag having an airbag main body enclosing a main gas space and extending from a lower end to an upper end being located above the lower end when the airbag main body is in a deployed state, the airbag main body being connected to the carrier via a connection section at the lower end of the airbag main body, and the airbag main body having an impact wall with an impact surface facing the occupant when the airbag is in the deployed state,
   an inflating device for filling the main gas space, and
   the airbag main body tapers from the lower end to the upper end,
   wherein the impact wall is formed with an indention in a lower part, which is the closest area to the occupant in the deployed state.

2. A restraining device according to claim 1 further comprising, that in the deployed state, the airbag main body has a basically triangle shape when viewed horizontally from the side, such that the fully deployed airbag main body is generally wedge-shaped, and further comprises a bottom wall, a connecting wall connecting the bottom wall and the impact wall, and two side walls.

3. A restraining device according to claim 2 further comprising, the length of the bottom wall is between 25 cm and 50 cm, and preferably between 30 cm and 50 cm.

4. A restraining device according to claim 2 further comprising, the impact wall is generally perpendicular to the bottom wall.

5. A restraining device according to claim 2 further comprising, the connection section is adjacent an edge between the impact wall and the bottom wall and is a section of the bottom wall.

6. A restraining device according to claim 1 further comprising, at least one vertical dividing wall is provided that divides the main gas space of the airbag main body into at least two chambers.

7. A restraining device according to claim 6 further comprising, at least one vent is provided between the at least two chambers.

8. A restraining device according to claim 6 further comprising, the inflating device inflates the at least two chambers independently.

9. A restraining device according to claim 8 further comprising, the inflating device can inflate one chamber of the at least two chambers prior to another chamber of the at least two chambers.

10. A restraining device according to claim 1 further comprising, at least one additional airbag body extends from the airbag main body at an upper end region of the airbag main body, the additional airbag body enclosing an additional gas space being in fluid connection to the main gas space, and forming an additional impact surface.

11. A restraining device according to claim 10 further comprising, two of the at least one additional airbag bodies extend from the airbag main body, such that the upper end region of the airbag formed of the airbag main body and the two additional airbag bodies form a U-shaped arrangement.

12. A restraining device according to claim 1 further comprising, the carrier is a lap-belt.

13. A vehicle seat with a restraining device according to claim 1 further comprising, wherein the carrier is movably connected to the vehicle seat.

14. A vehicle seat according to claim 13 further comprising, that the deployed airbag main body extends in a vertical direction at least to the position of a headrest of the vehicle seat.

* * * * *